US012728962B2

(12) United States Patent
Yanai

(10) Patent No.: US 12,728,962 B2
(45) Date of Patent: Sep. 8, 2026

(54) CONTROL SYSTEM FOR A HYDROFOIL WATERCRAFT WITH FULLY SUBMERGED HYDROFOIL

(71) Applicant: LEVEL HYDROFOILS LTD., Haifa (IL)

(72) Inventor: Arthur Yanai, Ashkelon (IL)

(73) Assignee: LEVEL HYDROFOILS LTD., Haifa (IL)

( * ) Notice: Subject to any disclaimer, the term of this patent is extended or adjusted under 35 U.S.C. 154(b) by 728 days.

(21) Appl. No.: 17/793,103

(22) PCT Filed: Mar. 22, 2021

(86) PCT No.: PCT/IL2021/050317
§ 371 (c)(1),
(2) Date: Jul. 15, 2022

(87) PCT Pub. No.: WO2021/149066
PCT Pub. Date: Jul. 29, 2021

(65) Prior Publication Data

US 2023/0043812 A1 Feb. 9, 2023

(30) Foreign Application Priority Data

Jan. 23, 2020 (IL) .......................................... 272219

(51) Int. Cl.
*B63B 32/10* (2020.01)
*B63B 1/24* (2020.01)
(Continued)

(52) U.S. Cl.
CPC .............. *B63B 32/10* (2020.02); *B63B 1/248* (2013.01); *B63B 1/286* (2013.01); *B63B 32/60* (2020.02); *B63B 39/06* (2013.01); *G05D 1/0875* (2013.01)

(58) Field of Classification Search
CPC ..... B63B 1/248; B63B 1/28; B63B 2001/281; B63B 1/283; B63B 1/285; B63B 1/286;
(Continued)

(56) References Cited

U.S. PATENT DOCUMENTS 3,886,884 A 6/1975 Stark et al.
4,100,876 A 7/1978 Feleus
(Continued)

FOREIGN PATENT DOCUMENTS

CN 1089561 A 7/1994
CN 208715431 U * 4/2019 ............. B63B 15/00
(Continued)

OTHER PUBLICATIONS

Extended European Search Report, EP 21743878.7 dated Jun. 6, 2023.
(Continued)

*Primary Examiner* — Ajay Vasudeva
(74) *Attorney, Agent, or Firm* — Daniel J. Chalker; Edwin S. Flores; Chalker Flores, LLP

(57) ABSTRACT

A stabilized a hydrofoil water craft comprising: a water-craft base member, a hydrofoil mast having proximal and distal portions; said proximal portion mechanically connected to said bottom side of said water-craft base member, a fuselage mechanically connected to said distal portion of said at least one hydrofoil mast, a rudder configured for controlling a yaw angle of said water craft, an elevator rotatable around an axis lying in a plane parallel to water-craft base member and a stabilization arrangement further comprising at least one sensor configured for detecting a 3D orientation of said water-craft base member, an estimator configured for estimating the 3D orientation, actuators for manipulating the rudder and elevator and a controller for analyzing the estimated 3D orientation and controlling the actuators. In
(Continued)

response to a disturb roll inclination of the water craft, the controller generates a command to a rudder actuator to compensate the detected inclination.

19 Claims, 14 Drawing Sheets

(51) Int. Cl.
*B63B 1/28* (2006.01)
*B63B 32/60* (2020.01)
*B63B 39/06* (2006.01)
*G05D 1/00* (2024.01)

(58) Field of Classification Search
CPC ........... B63B 1/30; B63B 39/06; B63B 32/10; B63B 32/60; B63B 32/64; B63B 32/66; B63B 34/10; B63B 34/40; G05D 1/048; G05D 1/0875
See application file for complete search history.

(56) References Cited

U.S. PATENT DOCUMENTS 5,448,963 A 9/1995 Gallington
7,047,901 B2 5/2006 Chen
9,359,044 B2 6/2016 Langelaan
10,358,194 B1 † 7/2019 Wengreen
10,597,118 B2 * 3/2020 Montague ............... B63B 32/10
10,994,815 B2 * 5/2021 Wengreen .............. B63B 32/10
11,097,822 B2 * 8/2021 Aoki ...................... B63H 11/08
11,731,741 B2 * 8/2023 Hagen ..................... B63B 32/64
114/274
2019/0135378 A1 5/2019 Tian
2023/0043812 A1 2/2023 Yanai

FOREIGN PATENT DOCUMENTS

DE 102017004636 A1 * 11/2018
ES 319117 A1 5/1966
WO WO-2018234969 A1 * 12/2018 ............... B63B 1/24
WO 2019/091437 A1 5/2019
WO 2020176033 A1 9/2020

OTHER PUBLICATIONS

International Search Report and Written Opinion, [ISA/IL] PCT/IL2021/050317 dated Jun. 30, 2021.

* cited by examiner
† cited by third party

CONTROL SYSTEM FOR A HYDROFOIL WATERCRAFT WITH FULLY SUBMERGED HYDROFOIL

CROSS-REFERENCE TO RELATED APPLICATIONS

This application is the National Stage of International Application No. PCT/IL2021/050317, filed on Mar. 22, 2021, which claims priority to Israel patent application IL 272219, filed on Jan. 23, 2020. The contents of each of the foregoing applications are hereby incorporated by reference herein.

FIELD OF THE INVENTION

The present invention generally pertains to a system and method for automatically stabilizing a hydrofoil watercraft with a single, fully submerged strut.

BACKGROUND OF THE INVENTION

Hydrofoils are used in many types of commercial and pleasure marine water craft including, but not limited to, surfboards, speed boats, racing boats, passenger carrying craft, and naval vessels. Hydrofoils, for which the hull is above the water, enable a water craft to make way more efficiently than a surface planning water craft or a displacement water craft, thus reducing the propulsion energy needed for a given speed. In the pleasure craft domain, hydrofoils introduce a sensation of flying which brings thrill and is appreciated by users.

In the last few years, there has been widespread adoption of hydrofoil applications for pleasure craft, most notably, the use of hydrofoils in the Americas Cup sailing competitions, in Moth class sailing competitions, for non-limiting example, for kite-propelled (kite-propelled boards), sail-propelled (sail-propelled boards), and wave propelled (surfboards) hydrofoil boards.

On a parallel plane, due to advances in technology, in the last ten years there have been significant developments in the field of motorized surf boards, using electricity and petrol as an energy source. A major factor that distinguishes surfboards from other watercraft is that control (both speed and direction) is achieved by weight shift rather than by movable surfaces (such as rudders) or thrust vectoring. Indeed, other methods of transport (skateboards and snowboards) also rely heavily on weight shift, and this method of control is central to the experience of surfing, snowboarding, and skateboarding.

WIPO patent application publication no. WO2019/091437 discloses a motorized hydrofoil apparatus that includes a sailboard having a top surface and a bottom surface; a first hydrofoil assembly; a pivotable second hydrofoil attached to a second support unit; and a propulsion system. The hydrofoil apparatus also includes one or more sensing units disposed on predetermined locations on a first support unit to operatively communicate to the second hydrofoil to automatically generate corrective responses to various destabilizing hydrodynamic effects to stabilize the hydrofoil apparatus.

However, although WO2019/091437 teaches adjustable horizontal control surfaces for pitch and roll control, it neither teaches nor suggests an adjustable vertical control surface for yaw control. The horizontal control surfaces taught therein require large amounts of power to operate, reducing the length of time the craft can be used between recharge or replacement of batteries, and significantly increase drag, thereby reducing the both the maximum speed of the craft and it maneuverability.

US granted U.S. Pat. No. 9,359,044 discloses a passively stable personal hydrofoil watercraft that has a flotation device, wherein a user can ride in a prone, kneeling, or standing position. The watercraft includes a strut having an upper end interconnected with the flotation device and lower end connected with a hydrofoil. The hydrofoil greatly reduces the power required to travel at higher speed. The watercraft also includes a propulsion system connected to the hydrofoil. Both longitudinal and directional control of the watercraft is via weight shift, eliminating the need of any movable surfaces. The flotation device, strut, and hydrofoil can be permanently interconnected or can be detachable.

However, the wing, rudder and elevator of the personal hydrofoil watercraft of U.S. Pat. No. 9,359,044 are completely fixed, with the watercraft being maneuvered by the user's weight shifts only Although built for passive stability, some amount of user experience is required in order to control the craft's height above the water and to level its attitude, making it unsuitable for completely unexperienced riders and limiting use for all but experienced riders.

US granted U.S. Pat. No. 7,047,901 discloses a motorized hydrofoil water craft that has a substantially horizontally disposed flotation device that can be configured to receive an adult human in a prone, sitting or standing position. The craft includes a hydro foil, a motor, and a steering mechanism. The hydrofoil can have various configurations and be detachable, while the motor can be electric and have an associated battery that is situated underwater in use. The steering mechanism can include a canard and be configured for vertical movement of the canard. Several embodiments are disclosed.

However, although the left and right halves of the wing (foil) of U.S. Pat. No. 7,047,901 are rotatable from a vertical to a horizontal configuration, the rotation occurs mechanically, in response to interactions between the water and the foil as the watercraft increases speed. There is no processor control of the foil configuration. The hydrofoil has an elevator which relies on mechanical sensing and actuation to maintain a correct flight height and the rudder is both separate from the main strut, which adds complexity, and it is controlled directly by the user which, similarly to the previous invention, requires experience to control.

It is therefore a long felt need to provide a system and method of stabilizing a hydrofoil watercraft with a stabilization system that is not passive and that is not mechanically dependent on the speed of the watercraft.

SUMMARY OF THE INVENTION

It is an object of the present invention to disclose a stabilized hydrofoil water craft comprising: (a) a water-craft base member having a top side and a bottom side; (b) at least one hydrofoil mast having proximal and distal portions; said proximal portion mechanically connected to said bottom side of said water-craft base member; (c) a fuselage having a main wing; said fuselage mechanically connected to said distal portion of said at least one hydrofoil mast; (d) a rudder configured for controlling a yaw angle of said water craft; (e) an elevator configured for controlling a pitch angle of said water craft; (f) a stabilization arrangement further comprising at least one sensor configured for detecting a 3D orientation of said water-craft base member, an estimator configured for estimating a height of said water-craft base member over a water level and yaw, pitch and roll angles, actuators configured for manipulating said rudder and elevator; and a controller configured for analyzing estimated values of height yaw, pitch and roll angles and controlling said actuators.

It is a core purpose of the present invention to provide, the controller which, in response to a disturb roll inclination of said water craft from a predetermined setpoint is configured for generating a command to a rudder actuator for rotation of said rudder such that said rudder induces a correcting roll inclination compensating said disturb roll inclination of water craft.

It is another object of the present invention to disclose the controller comprising software means installed thereon and based on an algorithm is selected from the group consisting of PID control, linear-quadratic regulator (LQR) control, fuzzy logic, machine learning, feedback linearization, and any combination thereof.

It is another object of the present invention to disclose the controller configured for compensating said disturb pitch and yaw inclinations from predetermined setpoint.

It is another object of the present invention to disclose the controller configured to control at least one of speed and direction of movement of said watercraft.

It is another object of the present invention to disclose the any of said roll, yaw, pitch, speed and direction setpoints which is controlled automatically or manually.

It is another object of the present invention to disclose the software means configured to sense a center of mass of a user relative to said watercraft.

It is another object of the present invention to disclose the center of mass providing at least one setpoint for controlling of at least one of direction of motion of said watercraft, speed of said watercraft and height of flight of said watercraft.

It is another object of the present invention to disclose the stabilized hydrofoil water craft comprising a control unit for manually controlling said roll, yaw, pitch, speed and direction; said control effector is selected from the group consisting of a tiller, a joystick, a button, a wheel, a trigger, a touchscreen, a keyboard, a pressure sensor, a foot pedal, an optical sensor, a remote control and any combination thereof.

It is another object of the present invention to disclose the stabilized hydrofoil water craft comprising a control unit for automatically controlling said roll, yaw, pitch, speed and direction; said control effector is selected from the group consisting of a tilt sensing (attitude) type control device, a pressure sensor, a foot pedal, an optical sensor, a load cell, a processor configured to analyze elevator deflection, a remote control and any combination thereof.

It is another object of the present invention to disclose the software means configured for presetting at least one route and following said at least one route.

It is another object of the present invention to disclose a cross-section of said hydrofoil mast having a longitudinal axis significantly greater than a transverse axis of said hydrofoil mast.

It is another object of the present invention to disclose the wing comprising at least one movable flap, said at least one movable flap is synchronically rotatable about a longitudinal horizontal axis of said wing.

It is another object of the present invention to disclose the hydrofoil water craft propelled by a member of the group consisting of: a jet-type configuration, by a propeller-type configuration, a paddle, a sail, a paddle wheel, a screw, a Voith Schneider Propeller (VSP), a kite and any combination thereof.

It is another object of the present invention to disclose the at least one sensor selected from a group consisting of: an attitude sensor, an acceleration sensor, a height sensor, a speed sensor, a location sensor, a yaw-angle sensor, a pitch-angle sensor, a roll-angle sensor and any combination thereof.

It is another object of the present invention to disclose the height sensor configured to measure a member of a group consisting of absolute height, height above sea level, depth below sea level and any combination thereof.

It is another object of the present invention to disclose the attitude sensor is configured to measure a member of a group consisting of pitch, roll, yaw and any combination thereof.

It is another object of the present invention to disclose the location sensor selected from a group consisting of: magnetic compass, GPS, pedometer, inertial navigation (INS), and any combination thereof.

It is another object of the present invention to disclose the speed sensor selected from a group consisting of: GPS, inertial sensor, marine pitot tube log, paddle wheel log, ultrasonic speed log and any combination thereof.

It is another object of the present invention to disclose the method of stabilizing a hydrofoil watercraft comprising steps of: (a) providing a hydrofoil watercraft comprising: (i) a water-craft base member having a top side and a bottom side; (ii) at least one hydrofoil mast having proximal and distal portions; said proximal portion mechanically connected to said bottom side of said water-craft base; (iii) a fuselage a fuselage having a main wing; said fuselage accommodating a propulsion arrangement configured for impelling said water craft; said fuselage mechanically connected to said distal portion of said at least one hydrofoil mast; (iv) a rudder rotatable around an axis thereof being perpendicular to said a water-craft base member; said rudder configured for controlling a yaw angle of said water craft; (v) a elevator rotatable around an axis thereof lying in a plane parallel to said water-craft base member; said elevator configured for controlling a pitch angle of said water craft; and (vi) a stabilization arrangement further comprising at least one sensor configured for detecting a 3D orientation of said water-craft base member, an estimator configured for estimating a height of said water-craft base member over a water level and yaw, pitch and roll angles, actuators configured for manipulating said rudder and elevator; and a controller configured for analyzing estimated values of height yaw, pitch and roll angles and controlling said actuators; in response to a disturb roll inclination of said water craft from a predetermined setpoint, said controller is configured for generating a command to a rudder actuator for rotation of said rudder; (b) sensing and estimating said disturb roll inclination; (c) generating a command by said controller; (d) transmitting said command to said rudder actuator; and (e) rotating said rudder by said rudder actuator such that said rudder induces a correcting roll inclination compensating said disturb roll inclination of water craft.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF THE PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a system and method for automatically stabilizing a watercraft.

The term 'mast' or 'strut' hereinafter refers to the main vertical member which connects the main body of the watercraft to the hydrofoil and propulsion unit. The terms 'mast' and 'strut' will be used synonymously.

The term 'attitude' hereinafter refers to the orientation of a watercraft, relative to the direction of travel.

The term 'hydrofoil' hereinafter refers to a system comprising a mast and at least one horizontal control surface that is attached to the underside of a watercraft, the hydrofoil configured such that, the speed of the watercraft being sufficient, the base of the watercraft rises at least partially out of the water.

The terms 'watercraft' or 'hydrofoil watercraft' hereinafter refer to a watercraft equipped with a hydrofoil. The terms 'watercraft' and 'hydrofoil watercraft' will be used synonymously.

The terms 'stabilize' and 'stabilization' hereinafter refers to active automatic correction of an aspect of the motion of the watercraft.

The present invention provides improved stability for a watercraft without compromising the benefits of hydrofoiling such as efficiency, fun of use, 'surfing' feeling and sense of flying.

The present invention comprises an electronically controlled stabilizing system comprising sensors and control surfaces, which provides dynamic stability for a hydrofoil watercraft, which is preferably a motorized watercraft, but can be, for non-limiting example, a sail-powered, wind-powered or wave-powered watercraft.

In a preferred embodiment of the electronically controlled stabilizing system for a hydrofoil watercraft, speed and direction of the watercraft can be controlled via a user's input, for example through shifting weight. In preferred embodiments, the user senses only the 'natural' feeling of using only body weight to control the speed and direction of the watercraft. The user need not be aware of the automatically-provided dynamic stability and, more importantly, does not require any additional, 'un-natural', control methods.

Figure 1:
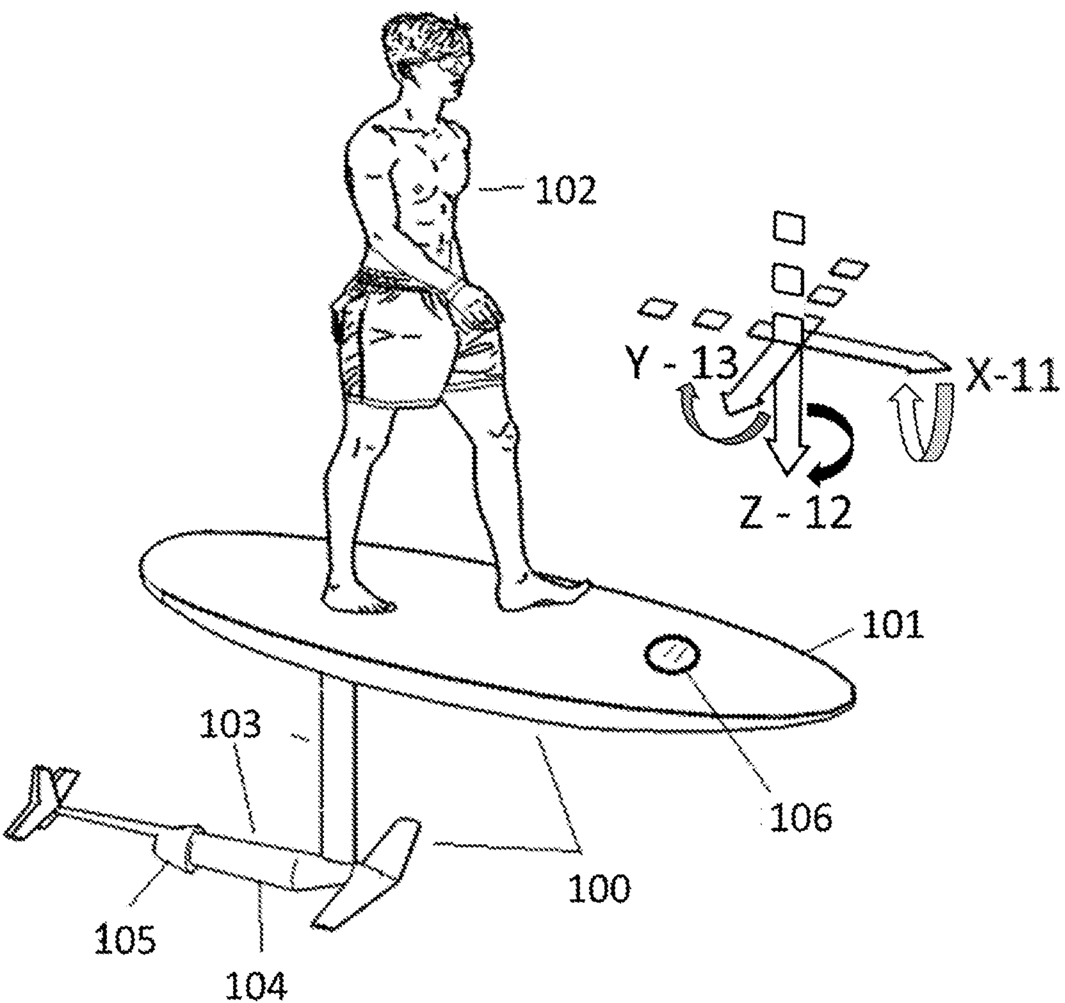
FIG. 1 is a perspective view of a hydrofoil water craft in accordance with an embodiment of the present invention with a definition of the motion axes.

Referring to FIG. 1, a perspective view is shown of a preferred embodiment of a hydrofoil water craft 100, with an illustrative user 102. The axes of motion are: a positive X axis 11 being the direction of motion, a negative Z 12 axis being downward, and a positive Y 13 axis being rightward when facing forward. Roll is rotation around the X axis, pitch is rotation around the Y axis, and yaw is rotation around the Z axis.

Craft 100 can include a board 101, a hydrofoil array 103, a motor 104 and propulsion unit 105, and a user interface unit 106. A user 102 is positioned on the negative Z side of the craft 100, while the hydrofoil array 103, motor 104 and propulsion unit 105 are on the Positive Z side of the craft 100.

While in flight, the combination of speed, wing load and angle of attack dictate the flying height. Greater wing load, lower speed and lower angle of attack cause the craft to lose height, 'sink,' and vice versa when the opposite parameters are applied. The angle of attack can be changed by deflection of control surfaces, speed can be changed by the throttle, and wing load is normally constant unless the craft is experiencing a banking turn, in which case a centrifugal force and thus a greater wing load is applied.

Roll, on the other hand, is intertwined with yaw rotation. Much like with a bicycle, where the user inputs yaw corrections via the handlebar to maintain roll stability, a hydrofoil of the type described above must input rudder correction in order to maintain roll stability. Furthermore, as with a bicycle, in order to achieve significant change in direction, the user must 'bank' into the turn, in other words, introduce roll tilt in order to turn left or right. The current invention can include gyroscopic, inertial and magnetic attitude sensors, as are commonly used in aerial applications, to constantly measure the roll, pitch and yaw (heading) angles. Height (above the water) sensing mechanisms come in a large variety as well, the most common ones being: a mechanical shaft coupled with an encoder 183 (FIG. 11, below), a depth pressure sensor 137 (FIG. 6A, below), a sound emitting (sonar or ultrasonic) proximity sensor 114 (FIG. 4, below), an electromagnetic emitting (such as IR, and photocell) proximity sensor 114 (FIG. 4, below), and a capacitive sensor. Other possible types of height sensor (not shown) include LIDAR, Radar, Sonar, LED, or any other type of distance sensing method. The current invention can use one or a combination of sensors as described above to sense the height/distance of the board from the surface of the water.

Speed of the craft is measurable using any technique known in the art, such as, but not limited to, GPS sensor, inertial sensor, marine pitot tube log 138 (FIG. 6A, below), paddle wheel log, ultrasonic speed log and any combination thereof. A real-time computerized calculation of the ratio between current wing angle of attack and wing load provided by load cells can give an estimation of flying speed as well. Any combination of the above speed sensing devices, and any other similar purpose speed sensing device can be used in the current invention.

The automatic stabilization electronic control unit or processor 113 (FIG. 4, below) can be designed in a large number of configurations, depending on design and performance needs, but in all cases will receive data from sensors and user input, filter (if needed), calculate the needed deflections and, in turn, deflect the control surfaces to achieve the desired state and stability. As in many control systems, the rate of data transmission is directly related to system stability and accuracy. Higher data transmission rates mean greater accuracy and resolution. Normally, a control system as disclosed in the current invention should have a feedback cycle operating at no less than 10 Hz.

Figure 2:
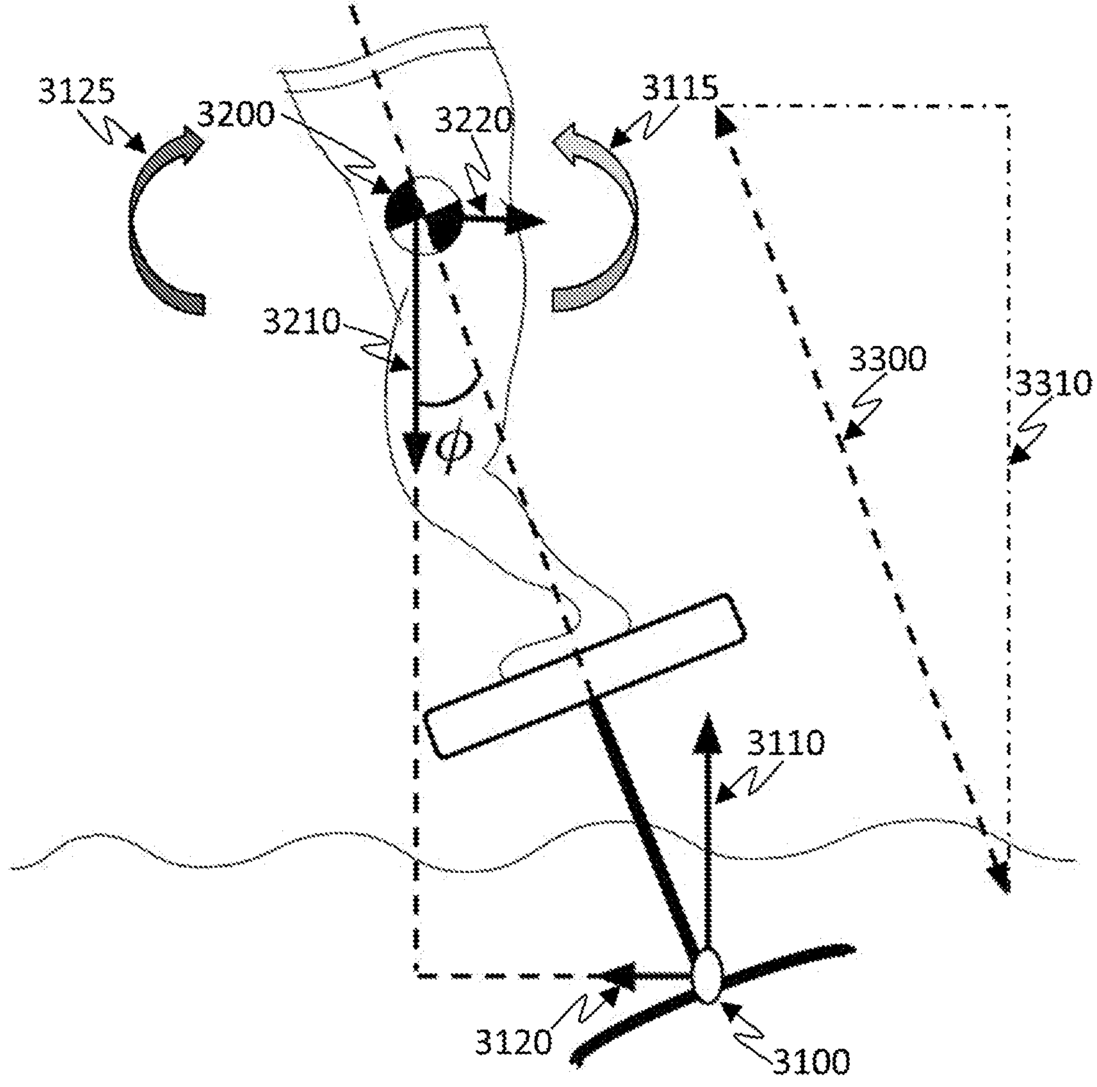
FIG. 2 illustrates the forces involved in the system of the present invention.

FIG. 2 illustrates the dynamics of the type of hydrofoil watercraft of the present invention, i.e. a hydrofoil watercraft with a single strut, fully submerged hydrofoil.

During normal flight, (i.e. the wings and other hydrodynamic submerged surfaces produce enough lift to sustain the water-craft and rider above the surface), the dynamics of a single strut fully submerged hydrofoil watercraft bear a close resemblance to the dynamics of an inverted pendulum and, therefore, the hydrofoil watercraft is inherently unstable.

The "point of suspension" of the inverted pendulum is the center of lift (3100); this is located on the hydrofoil. The "bob" is the system's center of gravity (3200), which has a mass M, mass M including both the mass of the user and the mass of the watercraft, with the line connecting the two (3300) being the equivalent of the "massless rod" connecting the "point of suspension" (center of lift, 3100) and the "bob" (3200, system center of gravity). The vertical distance (3310) between the system's center of gravity (3200) and the system's center of support (or center of lift) (3100) is $C_{Gh}$.

In any system where the "point of suspension" is below the "bob", a small disturbance induced in the roll angle (the angle between the craft's vertical axis and earth's vertical gravity axis), will tip the system over unless a correcting action is generated.

When in forward motion, the main forces acting on the longitudinal rotational X-axis are: Lift (both horizontal (3120) and vertical (3110) to the Z axis), gravity (Mg) (3210) and horizontal acceleration (Ma) (3220) due to centrifugal forces (neglecting all other minor forces).

In normal stages of flight, where small angles of roll inclination are present (roll inclination angle less than 14 degrees or 0.25 radians), the system can be linearized so that $\sin(\Phi)\approx\Phi$ and $\cos(\Phi)\approx 1$ (where $\Phi$ is in radians).

Assuming the height CGh is controlled and maintained constant, the weight of the entire system (rider weight and craft weight combined) is counter-balanced mostly by the main wing's vertical component of Lift (3110). If the system's roll angle is non-zero, a torque ($\tau_v$, 3115) around the X (roll) axis is produced, where $\tau_V$ (3115) is $$\tau_v = Mg\times\sin(\Phi)\times C_{Gh} \approx Mg\times\Phi\times C_{Gh}$$

Indeed, in order to return the system into an upright attitude (assuming only a minor roll angle is needed), the current invention relies on a Yaw-Roll coupling effect, accentuated in fully submerged hydrofoils, in which the center of gravity (3200) is at a significant vertical distance (CGh, 3310) above the center of lift (3100); the center of lift (3100) being beneath the waterline.

Rotational velocity around the yaw (Z) axis will generate an angle of attack on the horizontal component of the main strut and, to a lesser extent, on the horizontal component of the main wing, which in turn will create lift on the horizontal Y-axis (3120). This horizontal hydrodynamic lift force (3120) will also create a moment of force (torque) $\tau_h$ (3125) around the X (roll) axis, which opposes the roll torque $\tau_v$ (3115), where $\tau_h$ (3125) is $$\tau_h = \text{horizontal Lift}\times\cos(\Phi+\pi)\times C_{Gh} \approx \text{horizontal Lift}\times(-1)\times C_{Gh}$$

Precise yaw corrections induced by the rudder control surfaces, governed by the processor, will lead to adjustments in roll angle, preferably to the desired attitude.

In circular motion (where the hydrofoil craft is constantly 'turning'), centrifugal acceleration is described by $$a = \frac{V^2}{r} = \omega\times V$$

where a is the horizontal acceleration, V is the hydrofoil's velocity, r is the 'turn' radius and ω is the angular velocity around the Earth's gravity axis which is substantially parallel to the system's yaw axis for small angles of roll inclination. Horizontal centrifugal force is described by $$\text{centrifugal force} = Ma$$

An equilibrium state exists when counteracting moments of torque $\tau_v$ and $\tau_h$ described above are in opposite directions and are equal in magnitude, even if the roll angle is non-zero. Such an instance might be described by $Mg\times\Phi\times C_{Gh}=\text{horizontal Lift}\times(-1)\times C_{Gh}$ and by $g\times\sin(\Phi)\approx\omega\times V$. An equilibrium state such as this will lead to a constant change of direction in direct proportion to the roll angle. This might be utilized by the processor of the current invention in order to comply with user input requiring a change in direction.

At larger angles of roll inclination (roll inclination angle greater than 14 degrees or 0.25 radians), a greater compensation of pitch control is utilized by the control system in order to maintain a correct flight height.

Figure 3:
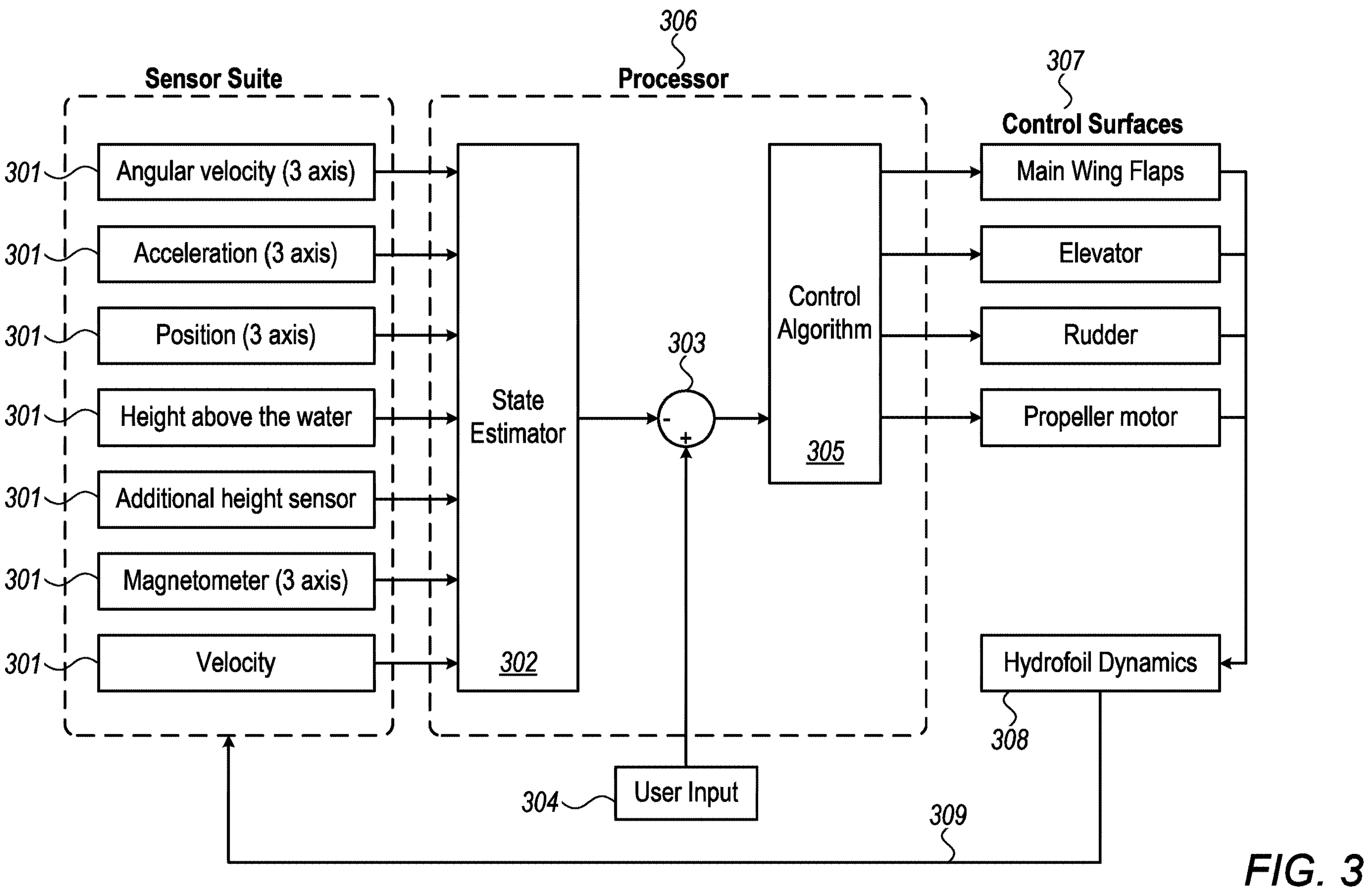
FIG. 3 is a schematic diagram illustrating the principle of the electronic stabilizing system.

FIG. 3 discloses an embodiment of a flow diagram of the stabilization control unit. Data are collected (301) from the sensors, typically angular velocity around all three axes, velocity in all three directions, acceleration in all three directions and position in all three directions, as well as the height of the watercraft above the water. Other data that can be collected include, but are not limited to, magnetometer data and at least one other height, for non-limiting example, the height of the bow of the hydrofoil watercraft above the surface of the water. If necessary, the measured data are filtered.

The sensor data are passed to the processor (306), where the state estimator (302) determines the linear velocities in all three directions and the angular velocities around all three axes, the measured heights, the magnetometer data and any other sensor data are analyzed by the control algorithm or controller (305) to generate the current state of the hydrofoil watercraft. This state is compared (303) to the user input (304), which can be input via a change in position as discussed hereinbelow, manual input via a control device as discussed hereinbelow, automatic input via a control device as discussed hereinbelow, and any combination thereof. The output of the comparator (303) is sent to a control algorithm or controller (305), which determines new positions for the control surfaces (307), which can include, but are not limited to, a main wing flaps, an elevator, a rudder, a thrust energizing device such as a propeller motor or jet control motor as discussed hereinbelow, and any combination thereof.

These new control surfaces (307) positions induce the hydrofoil watercraft to assume the desired state, such as, but not limited to, roll angle, yaw angle, pitch angle, velocity, turning rate and any combination thereof.

According to one embodiment of the present invention, in response to a disturb roll inclination of said water craft from a predetermined setpoint determined by comparator 303, control algorithm 305 generates a command to a rudder actuator (not shown) for rotation of said rudder such that the rudder induces a correcting roll inclination compensating the disturb roll inclination of water craft.

The dynamics of the hydrofoil watercraft having been affected by changes in the control surfaces (307), new data are collected (301) from the sensors and the cycle repeats.

The state, as determined by the state estimator (302) can include, but is not limited to, the roll angle (around the X axis) and the yaw angle (around the Y axis), the pitch angle (around the Z axis), a height above water, a velocity, an angular velocity, a turning rate, the local position, the global position and any combination thereof.

User input can include, but is not limited to, a roll angle, a yaw angle, a pitch angle, a turning/banking rate, the local position, the global position, a velocity, an angular velocity, a route, height and any combination thereof.

The control algorithm can include, but is not limited to, a PID control loop, a linear—quadratic regulator (LQR) control loop, fuzzy logic, feedback linearization, machine learning or any other similar method practiced by those with knowledge in the art, and any combination thereof.

Figure 4:
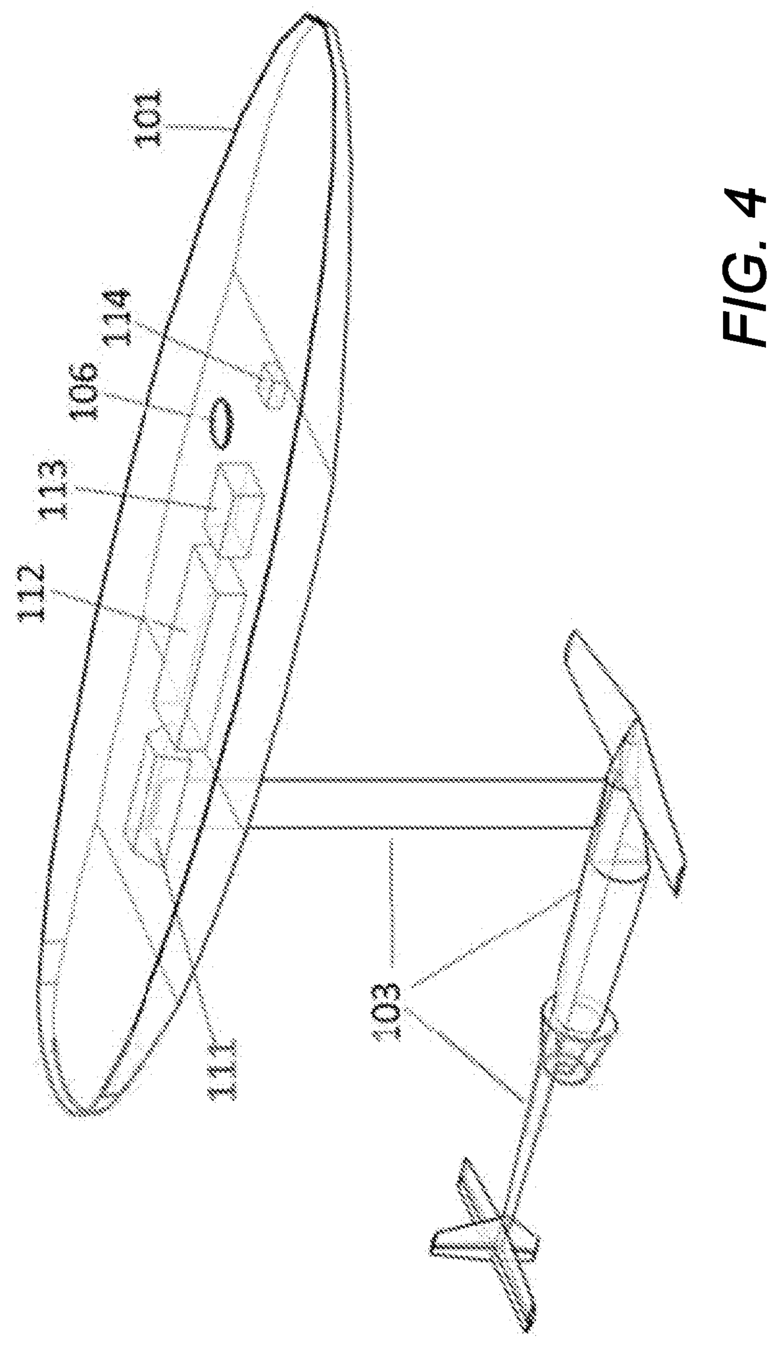
FIG. 4 is a perspective, exploded view of a foil assembly, control unit and sensors in accordance with an embodiment of the present invention.

Referring to FIG. 4, an exploded perspective view is shown of a preferred embodiment of the invention. The board can comprise a floating body 101 resembling a conventional surfboard or a small vessel that can support the weight of the user above the water until foiling speed is reached. Note that a larger volume board would allow for greater stability while in displacement state than a smaller volume board, but the larger volume board will also have a decreased maneuverability while in a foiling (flying) state due to increased mass and moment of inertia. The board can also house the control system. A typical control system can comprise a battery 112, a control unit 113 and at least one sensing unit 114. The sensing unit comprises a height sensor and can also comprise a velocity sensor, an acceleration sensor, a position sensor, a mast load sensor and any combination thereof. The processor typically comprises a motor control unit, an attitude sensor unit, a user interface panel and a control circuit board.

The hydrofoil array comprising the mast (strut), main wing, fuselage and stabilizer wings can be constructed out of composite material, metal, plastic, wood and any combination thereof. An upper end of the mast can be attached by the user to the underside (positive Z side) of the board using threaded bolts or a quick connection system, or the mast can be permanently attached to the underside of the board. The connection should be firm and rigid enough to support the weight of the user and withstand any unexpected underwater hydrofoil collisions with debris. The mast-board connection can also comprise at least one waterproof connection for electrical wiring, to provide electrical communication between the battery and the motor power supply, the control surface actuators and the sensor(s). A lower end of the mast can be attached by the user to the hydrofoil plane-form, the hydrofoil plane-form comprising main wing 117, fuselage 122, motor 104 and propulsion unit 105, stabilizer rudder wing 129 and control surface 123, and stabilizer elevator wing 128 and control surface 124.

As described herein, at least one of speed and direction of movement of the watercraft can be controlled. The control can be manual control, automatic control, autonomous control and any combination thereof.

Manual control comprises a user manually entering a value for at least one of a speed and a direction, for example, by moving a tiller right or left for direction control and forward or back for speed control.

Automatic control comprises control of at least one of height, speed and direction based on real-time action of a user, such as, but not limited to, a shift in a center of mass of the user.

Autonomous control comprises processor control of at least one of speed and direction based on a predetermined speed or direction for the watercraft.

Typically, in autonomous control, at least one route is available to a user, the route either automatically predetermined or input prior to a start of the route by a user. For non-limiting example, a user can predetermine a desired route, with a start point, one or more waypoints, and an end point. In this non-limiting example, with autonomous control, after the route is set, with no further input from the user, the watercraft will leave from the start point, travel from the start point to each of the waypoints in turn, with autonomous control ending at the stop point. In a variant of this non-limiting example, the speed of the watercraft is predetermined for at least one portion of the route, for non-limiting example, increasing speed from zero at the start point and decreasing it to zero at the end point, with higher speeds where the water is expected to be clear of other water traffic and lower speeds where rough water or other water traffic is likely.

For any of manual control, automatic control and autonomous control, the watercraft can be stabilized by active automatic correction of at least one aspect of the motion of the watercraft.

In some preferred embodiments, a user initially lies on the board in a prone position (or, for a more experienced user, in a sitting, kneeling or standing position) and activates the control unit and the electrical systems. The propulsion unit will not start producing thrust until the control unit is activated. In some embodiments of the invention, the user can shift body weight forward (toward the bow) while in displacement mode (without the user input), reducing the pitch angle of the board compared to its natural pitch angle, and signaling the control unit to commence thrust. In other embodiments, the user can increase the board's pitch angle to signal to the control to commence thrust. In yet other embodiments of the invention, the user can press a button which will signal to the control unit to commence thrust. A combination of the three methods, synchronized with visual or audio signaling, can be used in order contribute to reliability and to avoid unwanted thrust engagements.

If the control unit senses true and plausible pitch and roll angles (which rarely occur if the user is not on board), the unit will continue to increase the thrust levels up to a predefined level. Once a predetermined speed is reached, sensed by the speed sensors or calculated by the time elapsed from initial motor engagement, if the user is still present on board, the hydrofoil wings will produce lift. Once lift-off speed is reached, the control unit will command the elevator actuator to pitch the craft angle upwards, creating the needed positive angle of attack to support the weight if the craft and user (rider) and to lift the craft above the surface of the water, stabilizing the craft at a predetermined height, much like an airplane taking off from a runway and stabilizing itself at a constant altitude. Due to the inherently unstable physical nature of a craft of this kind, an electronic roll and pitch stabilization mechanism will be active throughout the entire acceleration and flying stages. A detailed description of the mechanism involved is disclosed hereinabove (see FIG. 3).

In some embodiments of the invention, once the craft is in flying mode, the user will center his body weight above a predetermined and marked position on top of the board, whether in a prone, sitting or standing position. The processor can analyze an elevator or other control surface position at least one signal such as that provided by at least one sensor such as (but not limited to) a load sensor and any combination thereof and determine in real time a projection of the location of the user's center of mass onto the board, comparing the projection to a predetermined location on the board for the center of mass, such as a position marked on top of the board. In order to accelerate, the user can lean forward 168, in the direction of the craft's motion, placing the projected body weight in front of the predetermined location, until a maximum speed is reached. In order to decelerate, the user can lean backward 169, shifting the projected body weight behind the predetermined location until a minimum speed is reached (causing the hydrofoil to land). In order to maintain speed, the user can place the center of mass above the predetermined location. Note that, in order to enhance accessibility and 'user friendliness', the speed changes will be gradual, as pre-determined by the user via the control unit's interface 106. Several 'modes' can be selected, making the craft easier to use on the one hand or more maneuverable on the other hand. Nevertheless, a larger deviation between the desired (marked) center of mass location and the actual center of mass will induce a greater acceleration than a smaller deviation in almost all modes of operation.

In some embodiments of the invention the weight shift can control direction of motion. Much like speed control, the direction of motion can be determined by the weight shift. Placing the user's weight above the longitudinal center line of the board will maintain the current direction of movement (flying), shifting the body weight left 170 will induce a left-hand banking turn/change of direction and, similarly, shifting the body weight to the right 171 will induce a right-hand banking turn. If standing, this sort of direction control resembles most 'board sports' (surfing, snowboarding, wake boarding, etc.), thus contributing to a natural feeling and a greater enjoyment.

Any prolonged sign of the user not being present on the board or a plausible loss of control sensed by the control unit 113 will cause motor deceleration or immediate cut off, as predetermined by the user. This unique method of engine cut off furthermore contributes to the 'natural' feeling of the craft by eliminating wires or tethers widely used by motorized marine sport products.

In some preferred embodiments, the speed of a hydrofoil craft can be controlled by a user shifting weight along the X axis. Due to the dynamic properties of hydrofoils (where the center of gravity (3200, see FIG. 2) is located above the center of lift (3100, see FIG. 2)), a change in the location of the center of gravity (3200, see FIG. 2) along the X axis will require elevator compensation in order to keep the system in equilibrium (maintain the same pitch and flight height). In a system such as the system of the present invention in which elevator deflection can be measured by the processor, it can sequentially be fed as user input back into the control algorithm (305, see FIG. 11) and thus change the craft's speed as requested by the user.

In some preferred embodiments the direction of a hydrofoil craft can be controlled by a user shifting weight along the Y axis. Due to the dynamic properties of hydrofoils (where the center of gravity (3200, see FIG. 2) is located above the center of lift (3100, see FIG. 2)), a prolonged change in the location of the center of gravity (3200, see FIG. 2) along the Y axis will induce-prolonged lateral linear acceleration around the Y axis. Since Y axis linear acceleration can be measured by the accelerometer, it can sequentially be fed as user input back into the control algorithm (305, see FIG. 11) and thus change the craft's desired roll angle as requested by the user, contributing to prolonged change in direction.

Figure 5:
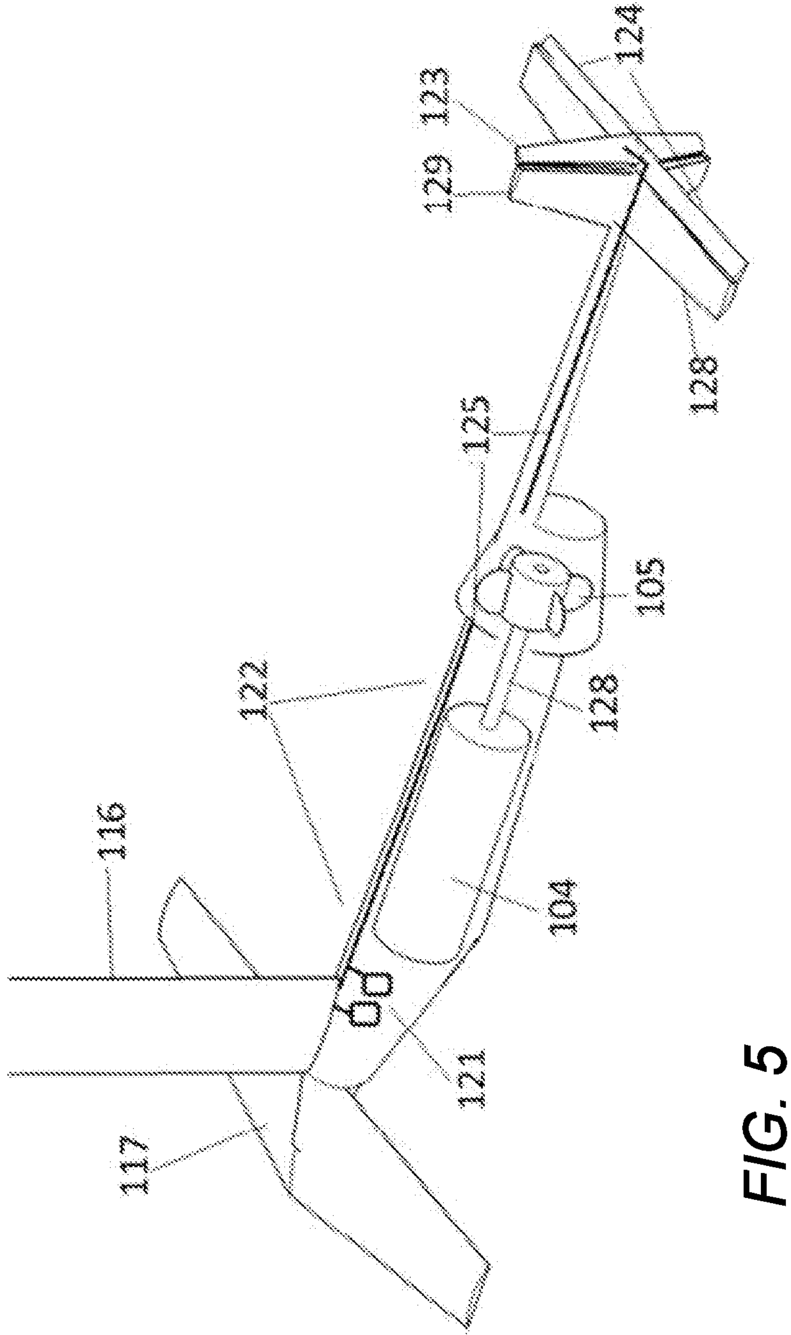
FIG. 5 is a close-up view of an embodiment of hydrofoil tail control surfaces.

Referring to FIG. 5, a close-up view of an embodiment of a hydrofoil mast 116, a main wing 117, tail wings, control surfaces and a propulsion unit is shown. Electric or mechanical actuators 121 can be embedded inside the fuselage 122. The actuators deflect the control surfaces 123, 124, in this embodiment by means of control rods 125. Movement of the actuators is governed by the control unit. Control communication between the control unit and an actuator can be wired, wireless and any combination thereof. If control communication is wired, the wired connection is via the mast 116, as disclosed above. Power for the actuators can be provided by a battery; for a battery in the board 100, the wired connection is via the mast 126, as disclosed above. The actuators, if made waterproof, can be exposed to outside water and pressure.

In preferred embodiments, an electric motor 104 connected to a propeller/impeller 127 via a shaft 128 can be used to produce propulsion. The motor can be exposed to the water and pressure if made waterproof. In some embodiments, an elevator 128 and rudder 129 type stabilizer wing configuration is used for overall stability while elevator flap 124 and rudder flap 123 are used to control flight height and direction of flight as well as to maintain roll stability. The rudder 129, the elevator 128 or both can be completely hinged or can be 'semi deflected' as in a skeg rudder construction. Dimensions of wings, mast, flaps, propulsion unit and fuselage can be determined by the behavior characteristics and performance required by the craft designer and the user.

Figure 6A:
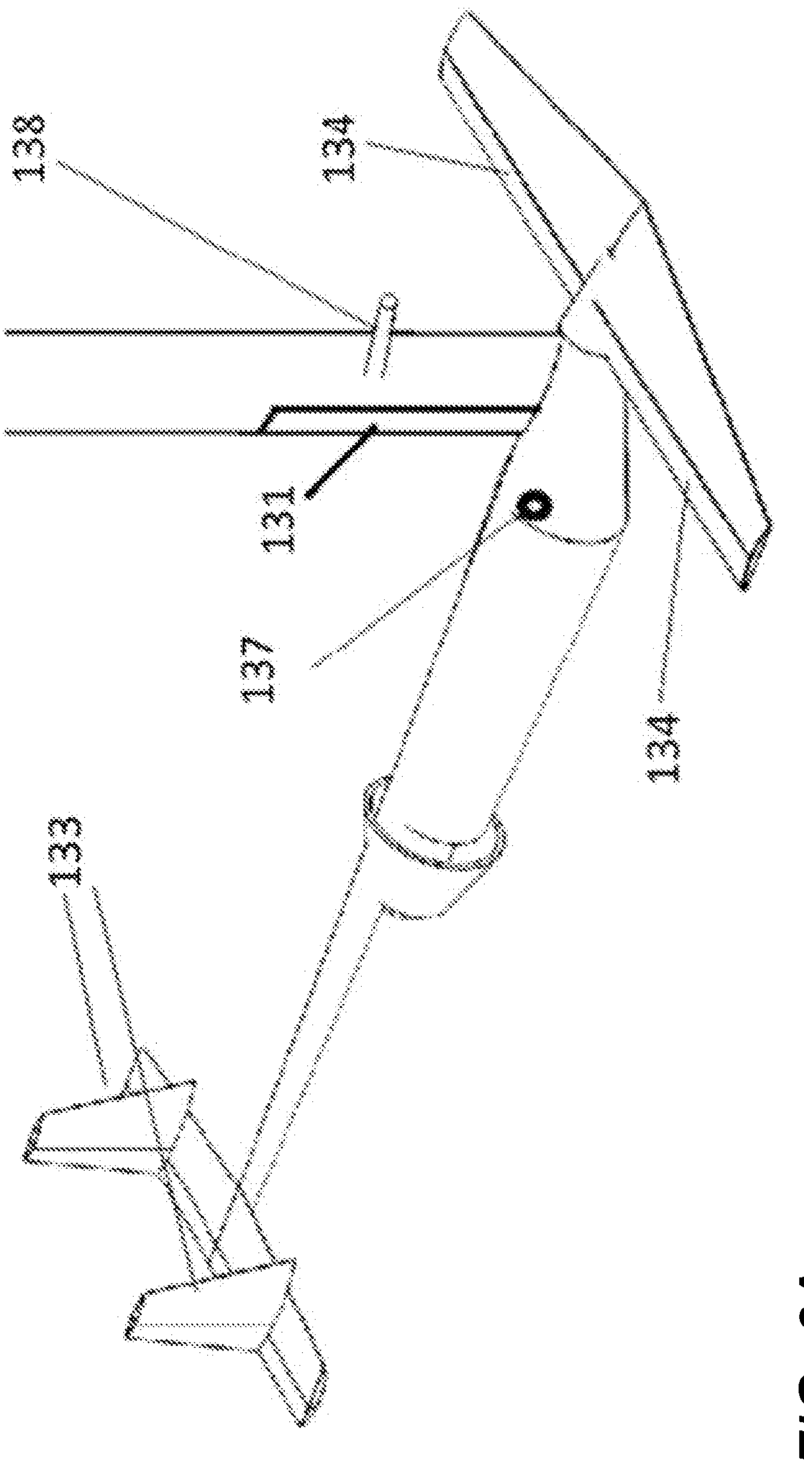
FIG. 6A-C show perspective views of embodiments of foil assemblies, control surfaces and sensors.
Figure 6B:
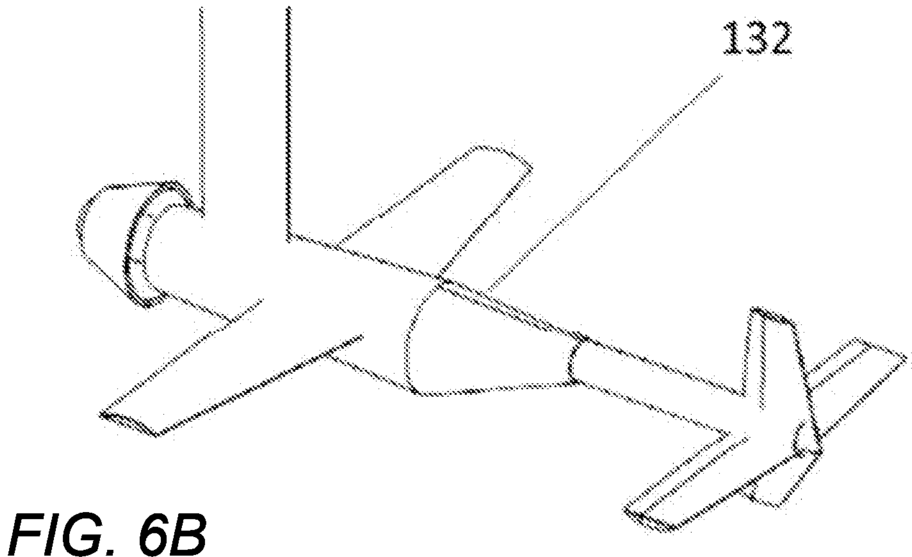
Figure 6C:
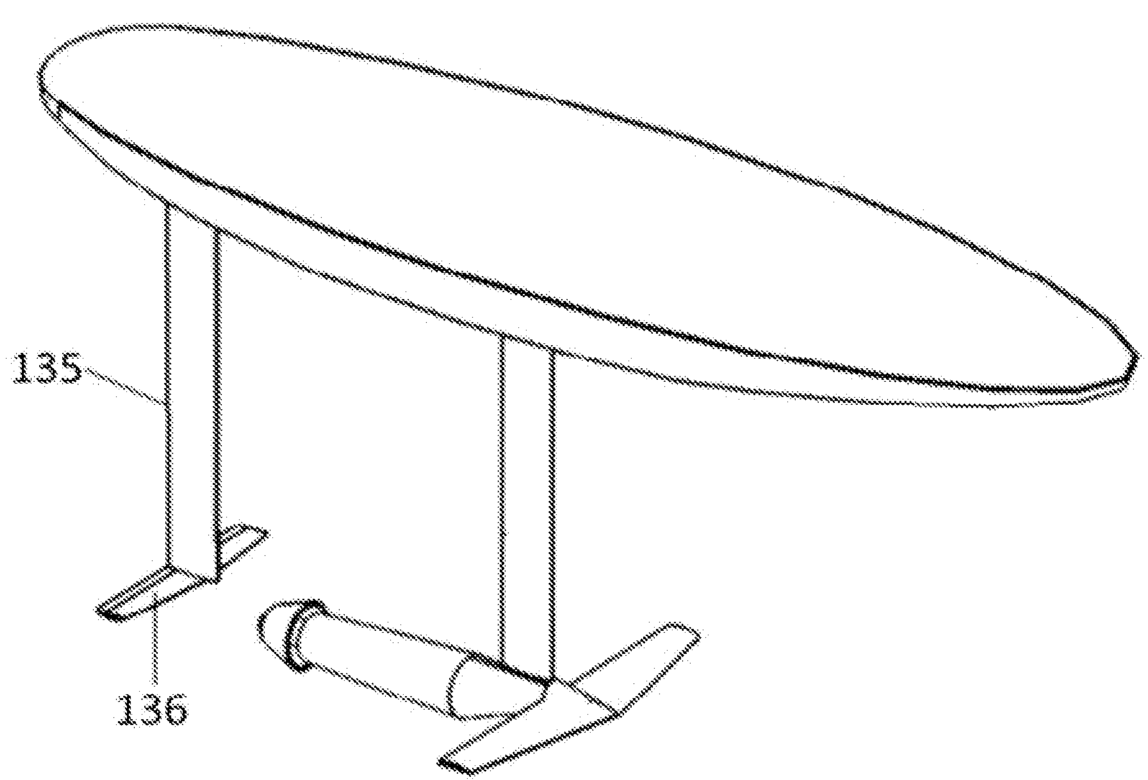

FIG. 6A-C illustrates embodiments of foil assemblies, control surfaces and sensors. In addition to or instead of the tail rudder and flap, a mast flap 131 (FIG. 6A) can be introduced allowing for directional (yaw) and roll control. In another embodiment (FIG. 6B) of the invention a 'canard type configuration' 132 can be utilized. Traditionally, a canard type scheme is more prone to instability but has the benefit of greater maneuverability. A double rudder configuration 133 (FIG. 6A) can be used in order to maximize effective lateral lift surfaces which in turn can increase the effect of rudder deflection. The rudder can be placed on top of or under the horizontal fuselage plane depending on design needs. A control surface in the wake of the propeller will increase the effectiveness of the surface but will add drag when not deflected, compromising performance. Main wing flaps 134 (FIG. 6A) can also be used for lift and flight height control, replacing or strengthening the control lift produced by the tail elevator. In yet another embodiment of the invention, a separate, additional strut 135 (FIG. 6C) (as in a sailboat configuration) can be used as a rudder, eliminating the need for a continuous fuselage and further spreading apart the hydrofoil mast and rudder. In this type of configuration, the entire aft strut can rotate around the vertical Z axis. The elevator coupled with horizontal control surfaces 136 (FIG. 6C) can be constructed on the lower part of the strut, contributing to height control in the same way as disclosed hereinabove. The submerged part of the hydrofoil array can also comprise a depth sensor 137 (FIG. 6A), a speed sensor 138 (FIG. 6A) and any combination thereof.

The invention can comprise a combination of the embodiments disclosed above.

Figure 7A:
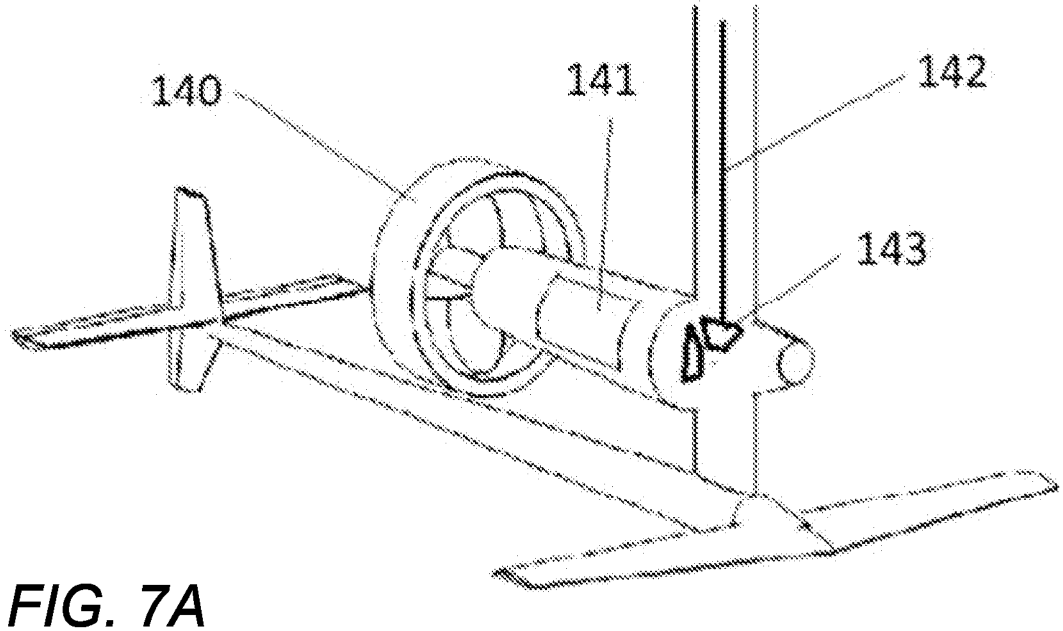
FIG. 7A-B shows perspective views of embodiments of hydrofoil propulsion systems.
Figure 7B:
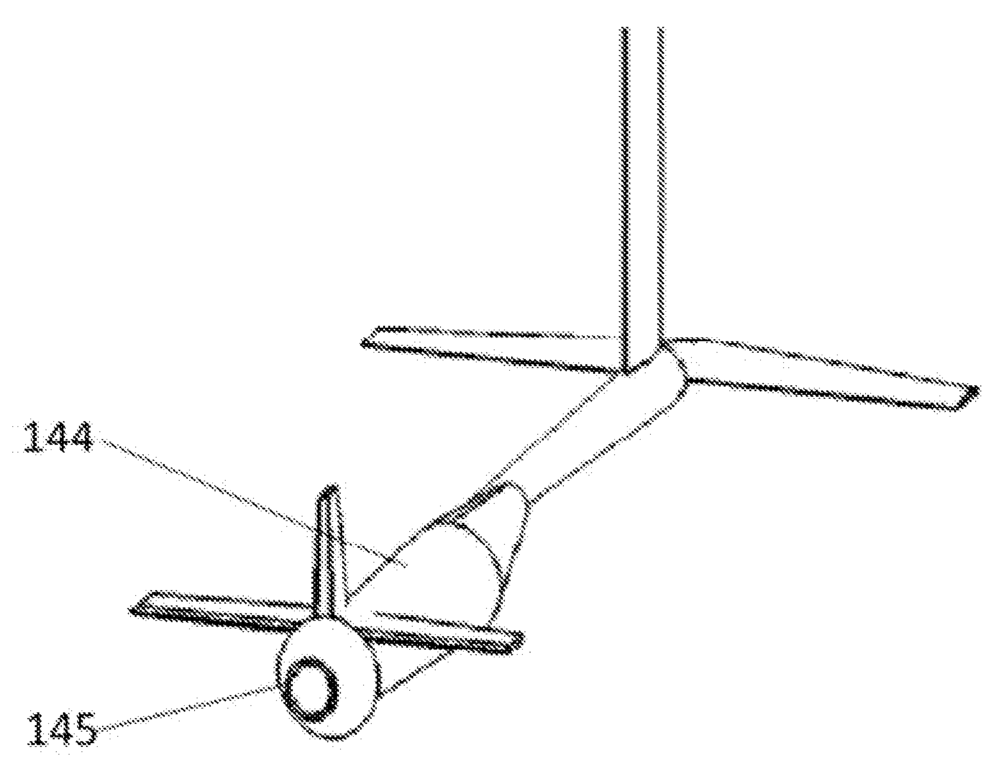

FIG. 7A-B illustrates embodiments of propulsion methods for the water craft of the present invention. In some embodiments, as illustrated in FIG. 7A, a ducted propeller 140 can be used.

The propeller can be mounted above the fuselage, below the fuselage, or be integrated with the fuselage. The propeller can be driven directly by an electric motor 141 or can be driven indirectly by an electric motor mounted inside the board via a shaft 142 and beveled gear 143. In some embodiments as illustrated in FIG. 7B, the craft can be propelled by an impeller housed inside a jet pump 144. In a jet-type configuration, particularly if the exit nozzle is placed aft of the mast, a vector thrusting nozzle 145 can be incorporated in order to improve and strengthen or in order to replace existing moving control surfaces for yaw/roll and pitch. Mechanical actuators can be used to direct the nozzle deflection. The invention can include one or a combination of the embodiments disclosed above.

Propulsion of the watercraft can be provided by a jet-type configuration, by a propeller-type configuration, a paddle, a sail, a paddle wheel, a screw and any combination thereof. In some embodiments, the craft is not provided with propulsion. In such embodiments, the propulsion can be by means of an external power source, such as, but not limited to, a wave, e.g., for a stabilized surfboard.

FIG. 8A-E discloses another embodiment of the invention. As disclosed above, the mast is preferably dismountable and, when connected to the board, both the mast and the mast-board connection are sturdy enough to withstand the loads occurring while hydrofoiling. In some embodiments, the mast's top end can be conically shaped 151 (FIG. 8A, FIG. 8D), conforming to a cavity housing mounted on the underside of the board (much like a conventional windsurfing fin mounting system). In other embodiments, a plate-shaped support 152 (FIG. 8B, FIG. 8C, FIG. 8D) can be used.

Figure 8A:
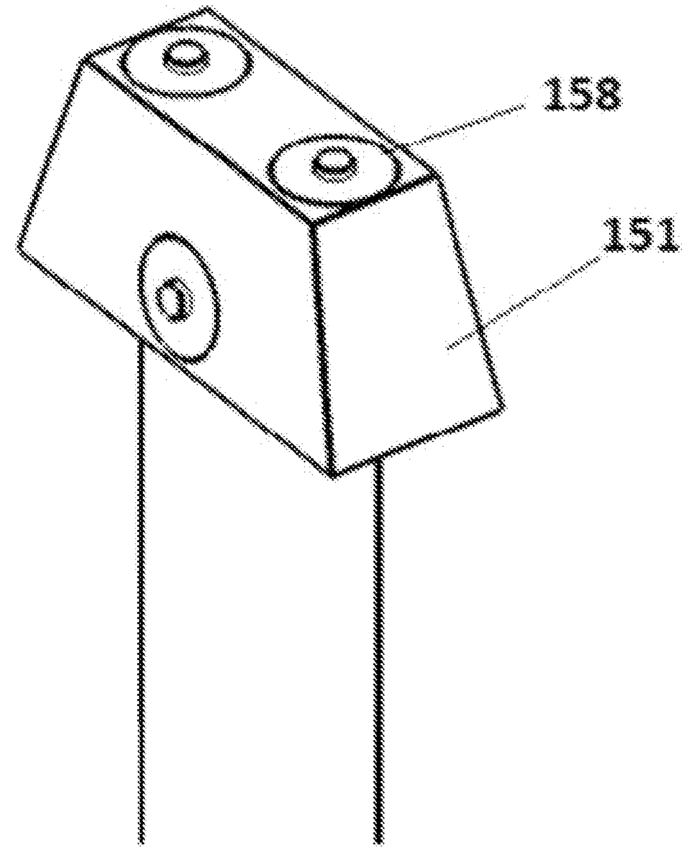
FIG. 8A-E shows perspective views of embodiments of mast load sensing methods.
Figure 8B:
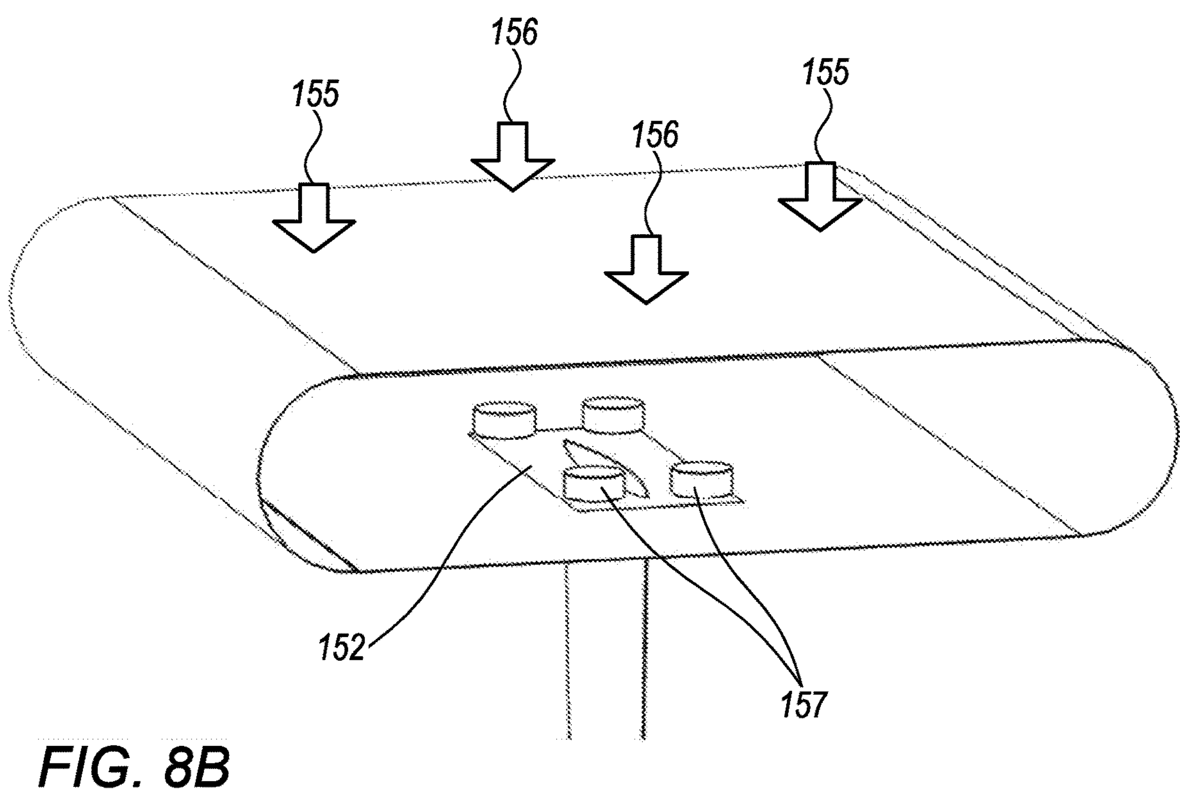
Figure 8C:
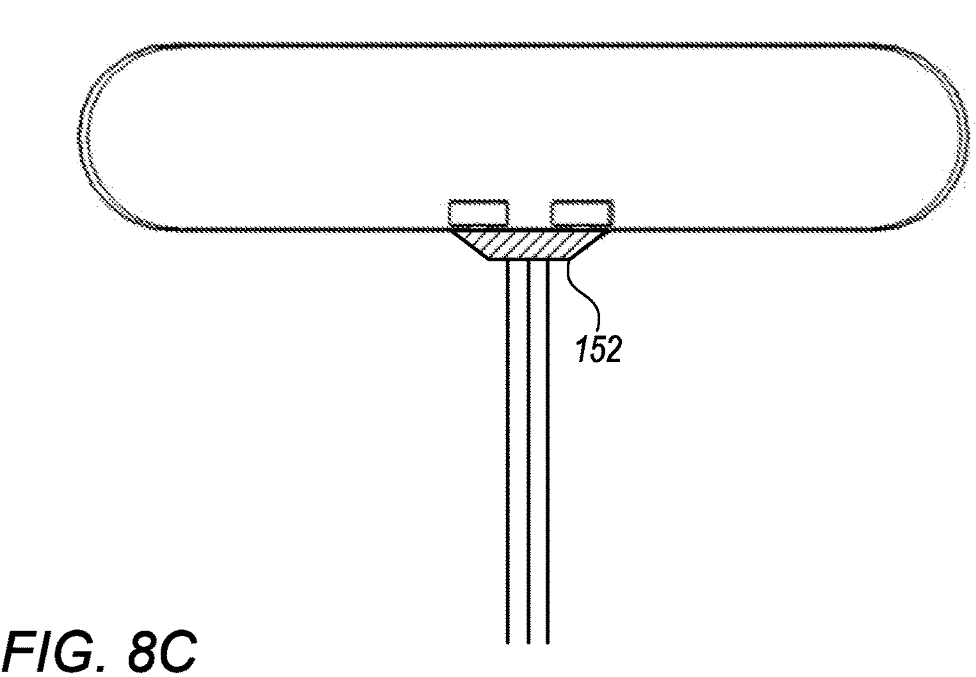
Figure 8D:
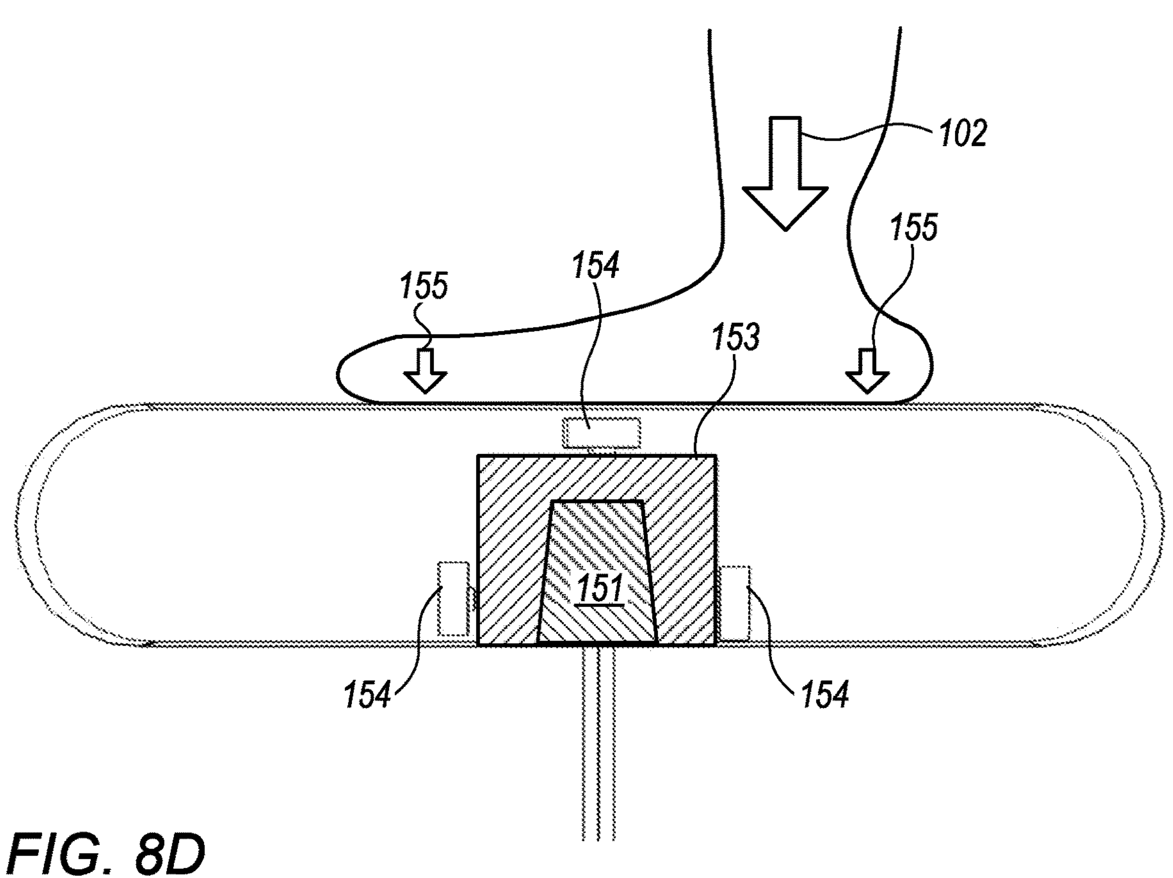
Figure 8E:
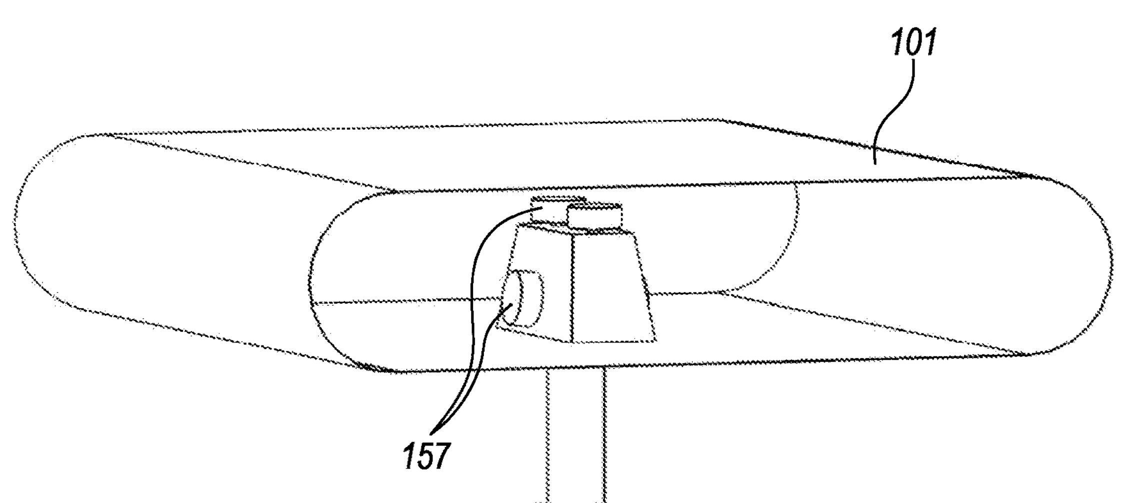

In yet other embodiments, as shown in FIG. 8D, the mast coupling/mount can 'float' inside a flexible pressure sensing 'box' 153 encapsulating the load sensors 154 inside the hull of the board 101 and eliminating their exposure to the water (increasing durability). Any of the above methods of mounting the mast can use at least one pressure/load sensor 154 in order to sense the user's 102 weight, weight distribution, and lateral pressure difference 155 (FIG. 8B, FIG. 8D) support and longitudinal pressure difference 156 (FIG. 8B) support. The sensor(s) can be housed inside the board 154 (FIG. 8D), upon its mating surface with the mast 157 (FIG. 8B, FIG. 8E), upon the mast 158 (FIG. 8A) and any combination thereof. The sensor signal(s) can be sent to the control unit, filtered and the load(s) calculated, thereby giving indication of the user's presence on the board, the user's weight, the user's weight distribution, the user's input for direction, the user's input for flight speed and any combination thereof. The invention can include one or a combination of the embodiments disclosed above.

Figure 9:
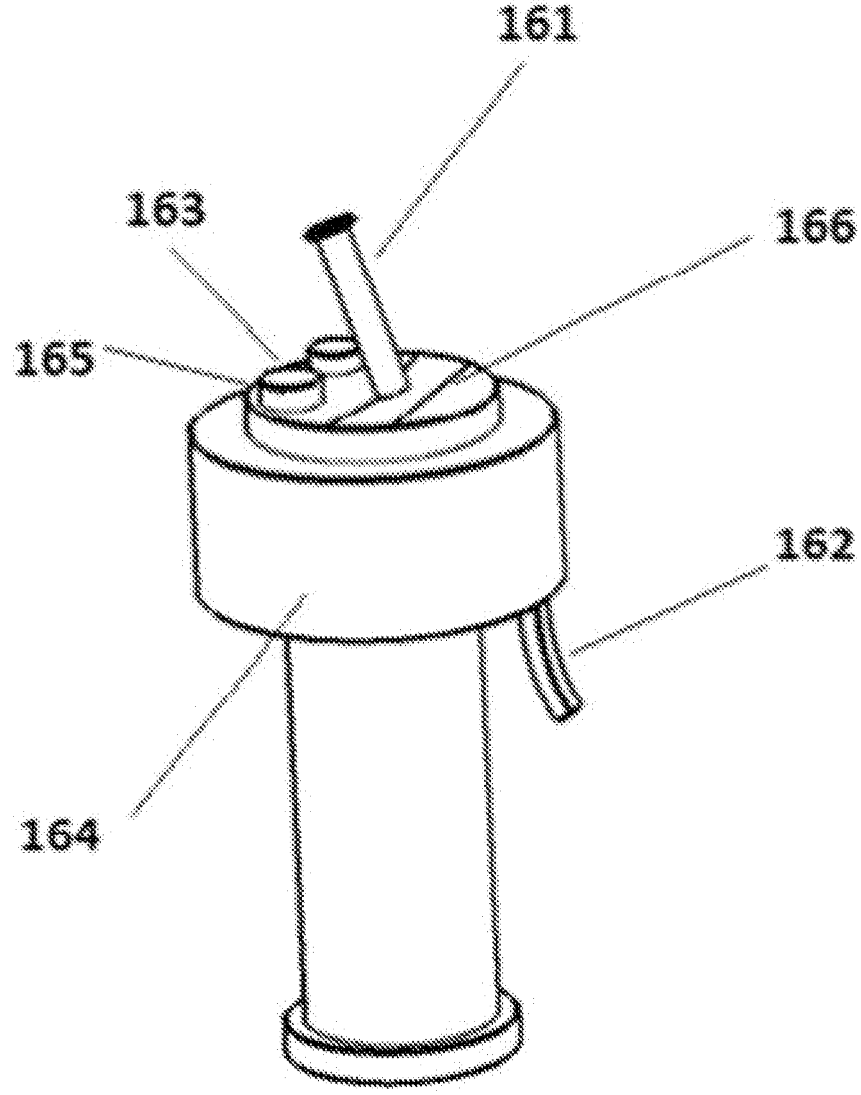
FIG. 9 is a perspective view of an embodiment of the invention which utilizes a hand-held remote-control device and a lever handle for control of motion.

FIG. 9 shows a perspective view of an embodiment of the invention which utilizes a hand-held remote-control device for control of motion. In this embodiment, the direction 161, speed 162, and height 163 can be controlled through a wired or wireless remote-control device 164. The user can input a command using a 'joystick' type 161 control device, a throttle type control device 162, a tilt sensing (attitude) type control device, by any hand operated command unit of a similar kind and any combination thereof. The remote-control device can also include at least one button 165, such as an activation button and a setting buttons, a current state/mode display 166, any other user interface function of that kind, and any combination thereof.

The manual control device can be selected from a group consisting of a tiller, a joystick, a button, a wheel, a trigger, a touchscreen, a keyboard, a tilt sensing (attitude) type control device, pressure sensor, a foot pedal, an optical sensor, a load cell and any combination thereof.

The optical sensor can sense hand movement, body movement, eye movement and any combination thereof, with the sensed movement indicating speed or direction of motion. For non-limiting example, an eye movement to the left or right can induce a left turn or right turn, respectively, of the watercraft, while an eye movement upward or downward increases or decreases, respectively, the watercraft's speed.

Figure 10:
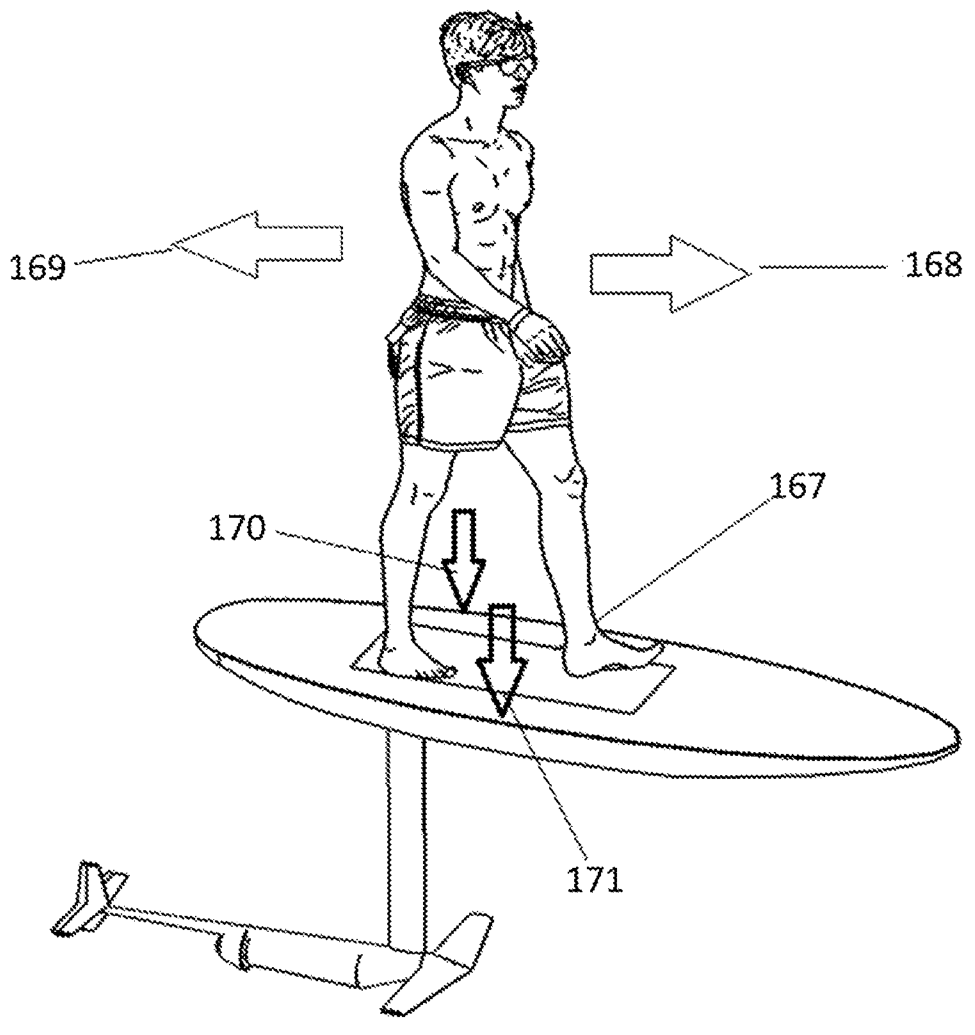
FIG. 10 is a perspective view of an embodiment of the invention with foot pad sensors for control of motion.

FIG. 10 shows a perspective view of an embodiment of the invention with at least one foot pad sensor 167 for control of motion. In this embodiment, control of direction and speed is governed by pressure sensed by one or more foot pads. In a manner similar to that disclosed in FIG. 8, the user's weight shift and pressure is sensed by the pads. The signals are sent to the control unit, which in turn determines if the user wishes to alter course/direction and speed and by what amount. Leaning forwards 168 will increase speed, leaning backwards will decrease 169 speed. Applying greater pressure on the left side 170 of the board will induce a left-hand banking turn and vice versa 171, when applying right side pressure.

The automatic control device can be selected from a group consisting of a tilt sensing (attitude) type control device, a pressure sensor, an optical sensor, a load cell, a processor configured to analyze elevator deflection, a remote control and any combination thereof.

Figure 11:
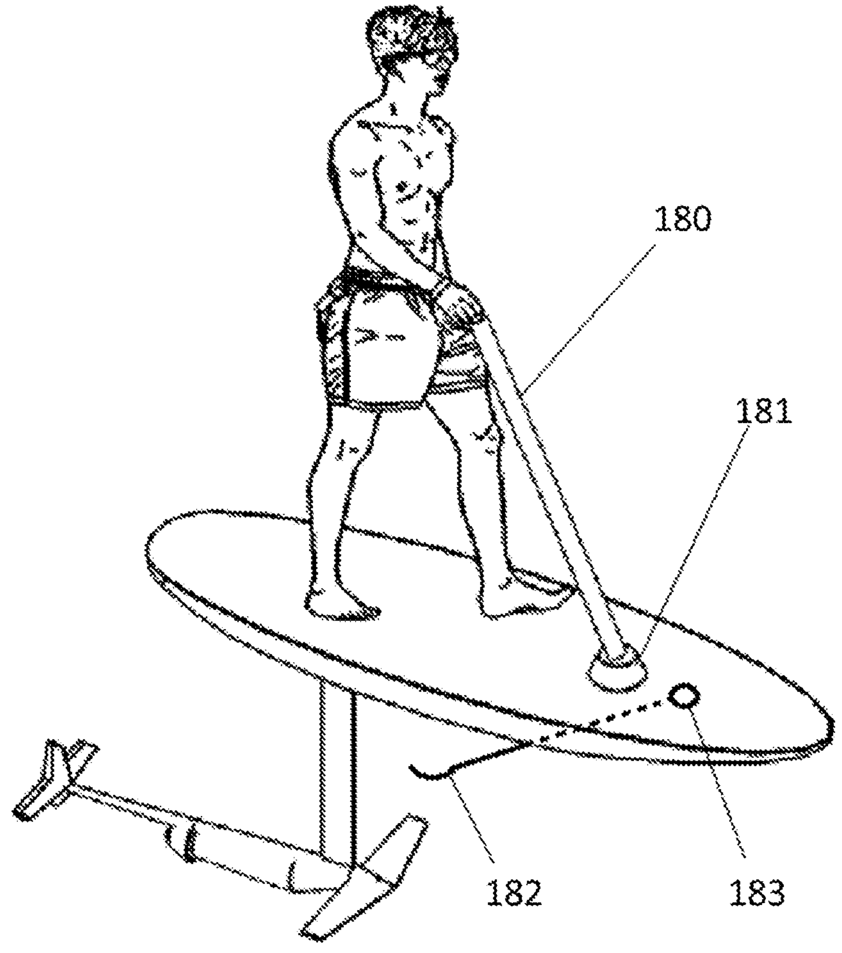
FIG. 11 is a perspective view of an embodiment of the invention with a lever arm for control of motion.

FIG. 11 is a perspective view schematically illustrating an embodiment of a device for control of motion and an embodiment of a device for height sensing. In embodiments of this type of motion control, the control is via a hinged lever arm 180 and sensors 181. In embodiments of this type, control of direction and speed is governed by at least one angle sensed in the base 181 of the lever arm (e.g., at least one of angle relative to the Z axis and angle in the X-Y plane). In a manner similar to that disclosed in FIG. 10, the user's commands are given by tilting the lever arm, with the tilt being sensed by encoders located at the base of the lever arm, and the tilt values are sent to the control unit which, in turn, determines whether to alter course direction and speed and by what amount. FIG. 11 also shows an embodiment of a method of height sensing. Height is sensed by mechanical pole/wand 182 hinged upon a rotational sensor (encoder) 183 and free to rotate around the Y axis.

In some embodiments, the craft will automatically maintain a constant flight height (above the surface of the water), independent of speed and user's position.

Embodiments of the invention can comprise any combination of the control methods disclosed herein.

Automatic control can comprise separate feedback control systems for roll and yaw of the watercraft. In some embodiments, pitch of the watercraft is also automatically controllable via a feedback control system. In a feedback control system, the feedback controls can be cascaded, with a combination of types of feedback control being used sequentially. A cascade can comprise two or more types of feedback control; a type of feedback control can be used more than once in a cascade. Automatic control can be provided for pitch, roll and yaw separately; for a combination of any two, with the third controlled separately; or for all three. The feedback control algorithm can be selected from a group consisting of PID control, linear—quadratic regulator (LQR) control, fuzzy logic, machine learning, feedback linearization, and any combination thereof.

For any of roll, yaw and pitch, the automatic control system can adjust any combination of roll, yaw and pitch to control the desired roll, yaw, pitch angle or height of flight. For non-limiting example, yaw of a watercraft can be controlled by automatically adjusting the roll angle and yaw angle of the watercraft to ensure that a desired yaw angle is maintained, the roll being controlled by a separated cascade. In another non-limiting example, roll and yaw are controlled by the same cascade; roll and yaw are simultaneously adjusted to maintain the desired roll and yaw angles.

It should be noted that, typically, the mast will have a cross-section where the longitudinal axis of the mast is significantly longer than the transverse axis of the mast.

The centroid of the main wing (foil) can have a transverse shape which is horizontal, Dihedral (angled or curved upward) or anhedral (angled or curved downward). Independently or in addition, the centroid of the main wing (foil) can be swept forward or swept back. Viewed from above, a projection of the main wing onto a horizontal plane can be curved, angular or any combination thereof. For non-limiting example, a leading edge of the main wing can be curved, while the trailing edge is angular.

It should be noted that controllably movable portions of the system, such as, but not limited to, the elevator, the rudder, a movable portion of the mast, a movable portion of the fuselage, a movable portion of the main wing, are typically operated by means of at least one motor, the motor being controlled by the processor. More than one movable portion can be operated by a single motor, or each movable portion can be controlled by a separate motor. Operation of the at least one motor is typically controlled by the processor.

In some embodiments, the main wing is fixed, comprising no movable parts.

In some embodiments, the main wing comprises at least two movable parts, the movable parts rotatable about a longitudinal horizontal axis of the main wing. In some variants of these embodiments, the at least two movable parts move in unison.

In some embodiments, the main wing comprises at least two movable parts, the movable parts rotatable about a lateral horizontal axis of the main wing, with at least one of the movable parts on the left (−Y) side of the main wing, relative to the mast, and at least one other movable part is on the right (+Y) side of the main wing, relative to the mast. In some variants of these embodiments, the left-side movable parts and the right-side movable parts move in unison. In other variants of these embodiments, the movements of the left-side at least one movable part are antiparallel to the movements of the right-side at least one movable part, e.g., when the left-side movable part moves upward, the right-side movable part moves downward and vice versa.

The methods described above suffice for leveled flight in perfect conditions, without interruptions and at a constant speed. As the speed changes, control surface effectiveness changes (at double the speed, lift produced from a given wing will quadruple). Moreover, while in a banking turn, the load that the lift surfaces experience will increase. Real-world interruptions and nonlinear effects such as the ones described above require a more sophisticated compensation system 209 which measures, evaluates and, where necessary, compensates for all the above parameters including: user weight 210, user weight distribution (which changes the system's moment of inertia), craft speed 211, and unevenness of the conditions. The current invention can comprise one or a combination of the stabilization methods described above. If the measurement(s) and the stabilization calculations are continuous and real-time, a prolonged controlled leveled flight can be achieved even by inexperienced users, overcoming outside interruptions like waves, other vessels' wakes, wind, water turbulence, etc. . . .

The invention claimed is:

1. A stabilized hydrofoil water craft comprising:

a. a water-craft base member having a top side and a bottom side;

b. a hydrofoil mast having proximal and distal portions, said proximal portion mechanically connected to said bottom side of said water-craft base member;

c. a fuselage having a main wing, said fuselage mechanically connected to said distal portion of said at least one hydrofoil mast;

d. a rudder, said rudder configured for controlling a yaw angle of said water craft wherein said rudder is connected to an aft portion of said fuselage;

e. a elevator rotatable around an axis thereof lying in a plane parallel to said water-craft base member; said elevator configured for controlling a pitch angle of said water craft; and f. a stabilization arrangement further comprising at least one sensor configured for detecting a 3D orientation of said water-craft base member, an estimator configured for estimating a height of said water-craft base member over a water level and yaw, pitch and roll angles, actuators configured for manipulating said rudder and elevator, and a controller implemented within a control unit, said controller configured for analyzing estimated values of the height, yaw, pitch and roll angles and controlling said actuators;

wherein, in response to a disturb roll inclination of said water craft from a predetermined setpoint, said controller is configured for generating a command to said actuator of said rudder for rotation of said rudder such that said rudder induces a correcting roll inclination compensating said disturb roll inclination of water craft.

2. The stabilized hydrofoil water craft of claim 1, wherein said controller comprises software means installed thereon and based on an algorithm is selected from the group consisting of PID control, linear-quadratic regulator (LQR) control, fuzzy logic, machine learning, feedback linearization, and any combination thereof.

3. The stabilized hydrofoil water craft of claim 2, wherein said software means is configured to sense a center of mass of a user relative to said watercraft.

4. The stabilized hydrofoil water craft of claim 3, wherein said center of mass provides at least one setpoint for controlling of at least one of direction of motion of said watercraft, speed of said watercraft and height of flight of said watercraft.

5. The stabilized hydrofoil water craft of claim 2, wherein said software means is configured for presetting at least one route and following said at least one route.

6. The stabilized hydrofoil water craft of claim 1, wherein said controller is configured for compensating said disturb pitch and yaw inclinations from predetermined setpoint.

7. The stabilized hydrofoil water craft of claim 1, wherein said controller is configured to control at least one of speed and direction of movement of said watercraft.

8. The stabilized hydrofoil water craft of claim 1, wherein any of said roll, yaw, pitch, speed and direction setpoints is controlled automatically or manually.

9. The stabilized hydrofoil water craft of claim 8 comprising a control unit for manually controlling said roll, yaw, pitch, speed and direction; said control effector is selected from the group consisting of a tiller, a joystick, a button, a wheel, a trigger, a touchscreen, a keyboard, an optical sensor, a remote control and any combination thereof.

10. The stabilized hydrofoil water craft of claim 8, comprising a control unit for automatically controlling said roll, yaw, pitch, speed and direction; said control effector is selected from the group consisting of a tilt sensing (attitude) type control device, a pressure sensor, a foot pedal, an optical sensor, a load cell, a processor configured to analyze elevator deflection, a remote control and any combination thereof.

11. The stabilized hydrofoil water craft of claim 1, wherein a cross-section of said hydrofoil mast has a longitudinal axis significantly greater than a transverse axis of said hydrofoil mast.

12. The stabilized hydrofoil water craft of claim 1, wherein said main wing comprises at least one movable flap, said at least one movable flap is configured for controlling a lift force applied to said stabilized hydrofoil water craft; said flap is rotatable about a longitudinal horizontal axis of said wing.

13. The stabilized hydrofoil water craft of claim 1, wherein said hydrofoil water craft is propelled by a member of a group consisting of: a jet-type configuration, by a propeller-type configuration, a paddle, a sail, a paddle wheel, a screw, a Voith Schneider Propeller (VSP), a kite and any combination thereof.

14. The stabilized hydrofoil water craft of claim 1, wherein said at least one sensor is selected from a group consisting of: an attitude sensor, an acceleration sensor, a height sensor, a speed sensor, a location sensor, a yaw-angle sensor, a pitch-angle sensor, a roll-angle sensor and any combination thereof.

15. The stabilized hydrofoil water craft of claim 14, wherein said attitude sensor is configured to measure a member of a group consisting of pitch, roll, yaw and any combination thereof.

16. The stabilized hydrofoil water craft of claim 14, wherein said location sensor is selected from a group consisting of: magnetic compass, GPS, pedometer, inertial navigation (INS), and any combination thereof.

17. The stabilized hydrofoil water craft of claim 14, wherein said speed sensor is selected from a group consisting of: GPS, inertial sensor, marine pitot tube log, paddle wheel log, ultrasonic speed log and any combination thereof.

18. The stabilized hydrofoil water craft of claim 1, wherein said height sensor is configured to measure a member of a group consisting of absolute height, height above sea level, depth below sea level and any combination thereof.

19. A method of stabilizing a hydrofoil watercraft comprising steps of:

a. providing a hydrofoil watercraft comprising:
  i. a water-craft base member having a bottom side;
  ii. a hydrofoil mast having proximal and distal portions, said proximal portion mechanically connected to said bottom side of said water-craft base member;
  iii. a fuselage having a main wing, said fuselage mechanically connected to said distal portion of said at least one hydrofoil mast;
  iv. a rudder configured for controlling a yaw angle of said water craft wherein said rudder is connected to an aft portion of said fuselage;
  v. a elevator configured for controlling a pitch angle of said water craft; and
  vi. a stabilization arrangement comprising at least one sensor configured for detecting a 3D orientation of said water-craft base member, an estimator configured for estimating a height of said water-craft base member over a water level and yaw, pitch and roll angles, actuators configured for manipulating said rudder and elevator, and a controller implemented within a control unit, said controller configured for analyzing estimated values of the height, yaw, pitch and roll angles and controlling said actuators;
    in response to a disturb roll inclination of said water craft from a predetermined setpoint, said controller is configured for generating a command to a rudder actuator for rotation of said rudder;

b. sensing and estimating said disturb roll inclination c. generating a command by said controller;

d. transmitting said command to said rudder actuator;

rotating said rudder by said rudder actuator such that said rudder induces a correcting roll inclination compensating said disturb roll inclination of water craft.

* * * * *